(12) United States Patent
Matsunaga et al.

(10) Patent No.: US 6,362,294 B1
(45) Date of Patent: *Mar. 26, 2002

(54) REDUCED OXIDATION STATE TRANSITION METAL COMPOUNDS USEFUL AS OLEFIN POLYMERIZATION CATALYSTS

(75) Inventors: Phillip T. Matsunaga, Houston; Rinaldo S. Schiffino, Kingwood, both of TX (US)

(73) Assignee: Exxon Mobil Chemical Patents Inc., Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,295

(22) Filed: Dec. 11, 1997

(51) Int. Cl.$^7$ .................................................. C08F 4/44
(52) U.S. Cl. .................... 526/161; 526/169.2; 526/106; 526/107; 526/130; 526/125.1; 526/348; 502/103; 502/117; 502/120; 502/162; 502/167
(58) Field of Search .................... 502/103, 162, 502/117, 120, 167; 526/161, 169.2, 106, 107, 130, 125.1, 348

(56) References Cited

U.S. PATENT DOCUMENTS

| | | | | |
|---|---|---|---|---|
| 4,870,042 A | * | 9/1989 | Kohara et al. | 502/114 |
| 5,312,794 A | * | 5/1994 | Kelsey | 502/117 |
| 5,374,696 A | | 12/1994 | Rosen et al. | |
| 5,494,874 A | | 2/1996 | Rosen et al. | |
| 5,502,124 A | | 3/1996 | Crowther et al. | |
| 5,504,049 A | | 4/1996 | Crowther et al. | |
| 5,519,099 A | | 5/1996 | Wang et al. | |
| 5,684,098 A | | 11/1997 | Wang et al. | |

FOREIGN PATENT DOCUMENTS

| | | |
|---|---|---|
| EP | 0 482 934 A1 | 4/1992 |
| EP | 0 537 609 A2 | 4/1993 |
| EP | 0 617 052 A2 | 9/1994 |
| EP | 0 816 386 A2 | 1/1998 |
| JP | 0-195110 A | 10/1987 |
| JP | 0 1095110 A | 10/1987 |
| JP | 8-127610 | 5/1996 |
| WO | WO 96/13529 | 5/1996 |
| WO | WO 97/17379 | 5/1997 |
| WO | WO 97/23492 | 7/1997 |

OTHER PUBLICATIONS

Kime–Hunt et al., Inorg. Chem., 28, 4392–4399, 1989.*

"Synthesis, Structure, and Olefin Polymerization Activity of Vanadium(V) Catalysts Stabilized by Imido and Hydrotris(pyrazolyl)borato Ligands," Scheuer, et al, Organometallics, 14, p. 2627–2629 (1995).

"A Catalytic System for Ethylene Polymerizatoin Based on Group III and Lanthanide Complexes of Tris(pyrazolyl)borate Ligands," Long, et al, J. Am. Chem. Soc., 118, p. 12453–12454 (1996).

"Syntheses, Structures, and Binding Constants of Cyclic Ether and Thioether Adducts of Soluble Cadmium(II) Carboxylates. Intermediates in the Homopolymerization of Oxiranes and Thiiranes and in Carbon Dioxide Coupling Processes," Darensbourg, et al, Inorg. Chem., 36, p. 2426–2432 (1997).

"Synthesis, Characterization, and Molecular Structures of a Series of [(3,5–Dimethylpyrazolyl)borator]vanadium(III) and –(IV) Complexes," Kime–Hunt, et al, Inorg. Chem., 28, p. 4392–4399, (1989).

"Progress Toward New Catalysts for Acyclic Diene Methathesis (ADMET) Polymerization Reactions," Blosch, et al, J. Molecular Catalysts, 76, p. 229–237, (1992).

"Complexes of Poly(Pyrazol–1–yl)borate Anions with the Early Transition Elements," Burchill, et al, Inorg. Nucl. Chem. Letters, vol. 12, p. 93–97, (1976).

"Polypyrazolylborate Complexes of Titanium and Vanadium," Manzer, J. Organometallic Chem., 102, p. 167–174 (1975).

"Hydrotris(1–pyrazolyl)borates of Chromium(III)," Abrams, et al, Inorganica Chimica Acta, 106, p. 69–74, (1985).

"Recent Advances in Poly(pyrazolyl)borate (Scorpionate) Chemistry," Trofimenko, Chem. Rev., 93, p. 943–980, (1993).

"13.6 Polypyrazolylborates and Related Ligands," Shaver, Comprehensive Coordination Chem., vol. 2, p. 245–259, (1987).

"Polymerization Of Olefins With Titanium And Zirconium Complexes Containing Hydrotris(pyrazolyl)borate Or Hydrotris(3,5–dimethylpyrazolyl)borate," Nakazawa, et al, J. Of Molecular Catalysis A: Chemical vol. 132, No. 1, p. 33–41, (1998).

"Ethylene Polymerization With Hydridoitris(pyrazolyl)boratoniobium Complexes As Precursors," Jaffart, et al, European Journal of Inorganic Chemistry, p. 425–426, (1998).

* cited by examiner

Primary Examiner—David W. Wu
Assistant Examiner—Ling-Siu Choi
(74) Attorney, Agent, or Firm—William G. Muller; Charles E. Runyan

(57) ABSTRACT

This invention is directed to reduced oxidation state Group 4–6 metal compounds, preferably the first row metals in those groups, suitable for activation as polymerization catalysts and characterized by comprising a substituted hydrotris(pyrazolyl)borate ancillary ligand and a plurality of single or multidentate uninegative ligands, excluding cyclopentadienyl ligands. The invention includes a polymerization process characterized by comprising contacting one or more monomers polymerizable by coordination or insertion polymerization under suitable polymerization conditions with these catalyst compositions.

32 Claims, 1 Drawing Sheet

REDUCED OXIDATION STATE TRANSITION METAL COMPOUNDS USEFUL AS OLEFIN POLYMERIZATION CATALYSTS

TECHNICAL FIELD

This invention relates to organometallic compounds comprising a Group 4–6 transition metal compound in which the metal is in a reduced oxidation state and which when activated by cocatalyst compounds, are suitable olefin polymerization catalysts.

BACKGROUND OF THE INVENTION

Coordination polymerization of olefinically unsaturated monomers is well known and has led to the great proliferation of thermoplastic compositions of matter from olefins, such as polyethylene, polypropylene, and ethylene propylene rubber. Early pioneers utilized the early transition metal compounds, particularly those of the Group 4 metals, with such activators as aluminum alkyl compounds. Later developments extended this work to bulky ancillary ligand-containing (e.g., η5-cyclopentadienyl) transition metal compounds ("metallocenes") with activators such as alkyl alumoxanes. Representative work addressing polymer molecular weight effects of substituted mono and bis metallocene compounds is described in EP-A 0 129 368 and its counterpart U.S. Pat. No. 5,324,800. Hetero-atom containing monocyclopentadienyl metallocene compounds are described in U.S. Pat. No. 5,057,475 and silicon bridged biscyclopentadienyl metallocene catalysts are described in U.S. Pat. No. 5,017,714. Recent developments have shown the effectiveness of ionic catalysts comprised of activated metallocene cations stabilized by compatible noncoordinating anions, see for example U.S. Pat. Nos. 5,278,119 and 5,384,299 and WO 92/00333, each of which is incorporated by reference for purposes of U.S. patent practice.

Transition metal polymerization catalyst systems from Group 5–10 metals wherein the active transition metal center is in a high oxidation state and stabilized by low coordination number polyanionic ancillary ligand systems are described in U.S. Pat. No. 5,502,124 and its divisional U.S. Pat. No. 5,504,049. Suitable low coordination number polyanionic ancillary ligands include both bulky imides and carbollides. Such are said to be suitable alone or in combination with conventional monoanionic ancillary ligands, such as cyclopentadienyl derivatives. Example 1 illustrates tris(pyrazolyl)borato vanadium oxide dichloride, a $d^0$ vanadium compound, and ethylene polymerization with it. Reduced Group 4–6 transition metal complexes useful as polymerization catalysts are described in WO96/13529. These complexes comprise a multidentate monoanionic ligand and two monoanionic ligands, optionally with extra ligands. Each example illustrates the use of titanium complexes having a cyclopentadienyl ligand.

Hydrotris(pyrazolyl)borate is an art recognized ligand for organometallic compounds and its use for $d^0$ compounds suitable as catalysts have been described. See, for example, WO 97/23492 describing bidentate tris(pyrazolyl)borate ligands on metals from Groups 8–10 used for low molecular weight polymers, and WO 97/17379 describing specifically substituted pyrazolyl containing ligand systems for transition metals, the examples illustrating primarily $d^0$ compounds of Group 4 metals. U.S. Pat. No. 5,312,794 describes ring opening metathesis polymerization of cyclic olefins using catalysts with a hydrotris(pyrazolyl)borate derivative of molybdenum and tungsten in the +4 or +5 oxidation states. With few exceptions, the use of tris(pyrazolyl)borate ("Tp") complexes as catalysts involves $d^0$ metal centers, as noted. The only prior art exemplifying a non-$d^0$ metal complex, WO 97/17379 in comparative example 12, shows such to have extremely low activity and to be essentially ineffective.

Additional catalysts would be desirable to supplement the above described technology, particularly those suitable for use as insertion polymerization catalysts for olefins.

This invention is directed to reduced oxidation state Group 4–6 metal compounds, (those having $d^1$–$d^3$ electron configurations) preferably the first row metals in those groups, suitable for activation as polymerization catalysts and characterized by comprising a substituted tris(pyrazolyl) borate ancillary ligand and a plurality of single or multidentate uninegative ligands, excluding cyclopentadienyl ligands and at least one neutral obner group. The invention includes a polymerization process characterized by comprising contacting one or more monomers polymerizable by coordination or insertion polymerization under suitable polymerization conditions with these catalyst compositions.

DESCRIPTION OF DRAWINGS

FIG. 1 is the trace for the product prepared in Example 9 at a polymerization temperature of 30° C.

FIG. 2 is the trace for the product prepared in Example 10 at a polymerization temperature of 60° C.

FIG. 3 is the trace for the product prepared in Example 11 at a polymerization temperature of 115° C.

BEST MODE AND EXAMPLES OF THE INVENTION

Figure 1:
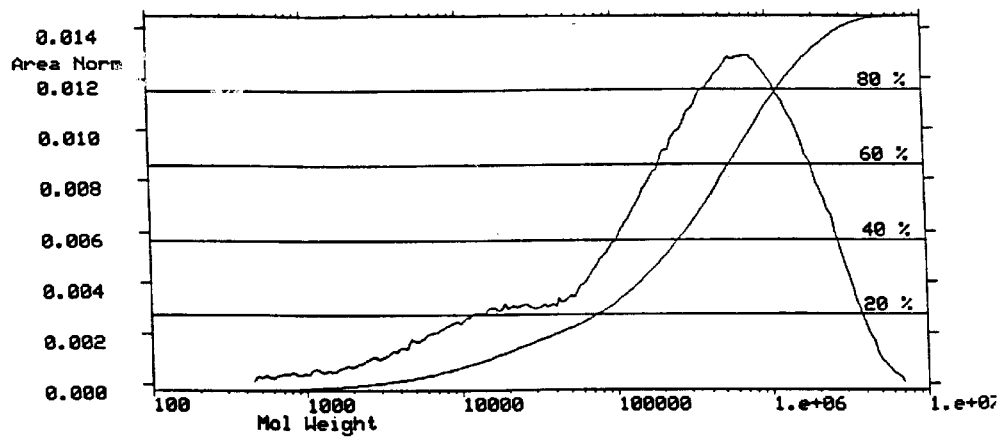
FIGS. 1–3 are GPC (gel permeation chromatography) traces of polyethylene homopolymer products prepared with the invention catalyst [HB(3,5-Me$_2$Pz)$_3$]VCl$_2$(thf).

The invention metal compounds described above can be generically represented by the following chemical formula:

$$TpMX_nL_p$$

where Tp is a substituted tris(pyrazolyl)borate ligand; M is a Group 4–6 transition metal; X is independently halogen, alkoxide, aryloxide, amide, phosphide, hydride, hydrocarbyl, substituted hydrocarbyl, halocarbyl, substituted halocarbyl; hydrocarbyl- or halocarbyl-substituted organometalloid, or two groups are joined and bound to the primary ligand or transition metal to form a ring structure, or one or more groups can contain a neutral donor group; L is a neutral donor group which stabilizes the complex; n is a number which is determined by counterbalancing the charge on the metal such that the metal remains in a reduced oxidation state and the overall charge on the precursor complex is neutral; p is a number from 1–3, as necessary to stabilize the compound. Substitution on the Tp ligand can be any member of the group defined by X in the foregoing definition, and are preferably $C_1$–$C_{10}$ hydrocarbyl moieties, most preferably $C_1$–$C_6$. The following general formula represents these compounds:

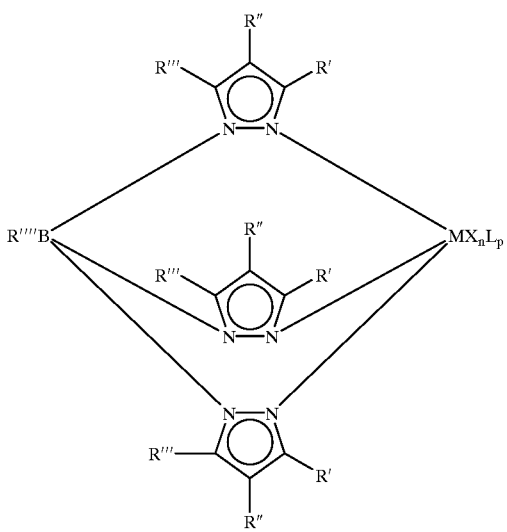

wherein each of the labeled substituents are as defined above. Each of R', R," R'" and R"" are independently defined as X above.

Source compounds for the L neutral donor groups include any neutral Lewis base compounds capable of donating an electron pair to the metal center. Non-limiting examples include diethylether, trimethylamine, tetrahydrofuran, dimethylaniline, aniline, trimethylphosphine, n-butylamine, and the like.

An illustrative, suitable catalyst precursor of this invention is $[HB(3,5-Me_2C_3N_2H)_3]MCl_2(C_4H_8O)$, where M=Ti, V, Cr. The catalyst compounds of the invention may be prepared in high yields using standard organometallic synthetic routes as illustrated in the appended examples.

The metal compounds according to the invention may be activated for insertion polymerization catalysis by known methods for either of Ziegler-Natta or metallocene transition metal compounds suitable for coordination polymerization. This activation is achieved for coordination polymerization by the inclusion of at least one reactive metal-ligand sigma bond ligand and at least one single vacant orbital adjacent (cis) to the sigma bound ligand, as is achieved by activation. The traditional activators of coordination polymerization art are suitable, those typically include Lewis acids such as Ziegler organometallic cocatalysts and alumoxane compounds, and ionizing, anion precursor compounds that abstract one ligand so as to ionize the metal center into a cationic complex and provide a counter-balancing weakly or noncoordinating anion.

The Ziegler cocatalyst will typically be an organometallic compound of a metal of Groups 1, 2, 12 or 13 of the Periodic table of elements. Preferred are organoaluminum compounds selected from the group consisting of aluminum alkyl and aluminum alkyl halide. These can be represented by the formulae:

$$Al(R^2)_sX'_{3-s},$$

wherein $R^2$ is independently a hydride or $C_1$ to $C_{10}$ hydrocarbyl radicals including aliphatic, alicyclic or aromatic hydrocarbon radicals, X' is a halogen and s is an integer from 1 to 3; and, $Al_2R^2_3X'_3$, which are hydrocarbylaluminum sesquihalides.

Examples include triethylaluminum, triisobutylaluminum, diethyl aluminumchloride, $Al_2Et_3Cl_3$ and $Al_2(i-Bu)_3Cl_3$.

Alkylalumoxanes and modified alkylalumoxanes are suitable as catalyst activators, particularly for the invention metal compounds comprising halide ligands. The alumoxane component useful as catalyst activator typically is an oligomeric aluminum compound represented by the general formula $(R''—Al—O)_n$, which is a cyclic compound, or $R''(R''—Al—O)_nAlR''_2$, which is a linear compound. In the general alumoxane formula R" is independently a $C_1$ to $C_{10}$ alkyl radical, for example, methyl, ethyl, propyl, butyl or pentyl and "n" is an integer from 1 to about 50. Most preferably, R" is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane. Methylalumoxane and modified methylalumoxanes are preferred. For further descriptions see, U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180, each being incorporated by reference for purposes of U.S. patent practice.

When the activator is an alumoxane, the preferred transition metal compound to activator molar ratio is from 1:2000 to 10:1, more preferably from about 1:500 to 10:1, even more preferably from about 1:250 to 1:1 and most preferably from about 1:100 to 1:1.

The term "noncoordinating anion" is recognized to mean an anion which either does not coordinate to the metal cation or which is only weakly coordinated to it thereby remaining sufficiently labile to be displaced by a neutral Lewis base, such as an olefinically or acetylenically unsaturated monomer.

Descriptions of ionic catalysts, those comprising a transition metal cationic complex and a noncoordinating anion, suitable for coordination polymerization appear in the early work in U.S. Pat. Nos. 5,064,802, 5,132,380, 5,198,401, 5,278,119, 5,321,106, 5,347,024, 5,408,017, 5,599,671, and international publications WO 92/00333 and WO 93/14132. These teach a preferred method of preparation wherein metallocenes are protonated by noncoordinating anion precursors such that an alkyl/hydride group is abstracted by protonation from a transition metal to make it both cationic and charge-balanced by the noncoordinating anion. Since the abstraction and insertion ligands of such metallocenes also may be ligands of the metal compounds of the invention, similar methods of preparation as active polymerization catalyst components may be followed.

The use of ionizing ionic compounds not containing an active proton but capable of producing both an active metal cationic complex and a noncoordinating anion is also useful. See, EP-A-0 426 637, EP-A-0 573 403 and U.S. Pat. No. 5,387,568 for instructive ionic compounds. Reactive cations of the ionizing ionic compounds, other than the Bronsted acids, include ferrocenium, silver, tropylium, triphenylcarbenium and triethylsilylium, or alkali metal or alkaline earth metal cations such as sodium, magnesium or lithium cations. A further class of noncoordinating anion precursors suitable in accordance with this invention are hydrated salts comprising the alkali metal or alkaline earth metal cations and a non-coordinating anion as described above. The hydrated salts can be prepared by reaction of the metal cation-noncoordinating anion salt with water, for example, by hydrolysis of the commercially available or readily synthesized $LiB(pfp)_4$ which yields $[Li.xH_2O] [B(pfp)_4]$, where (pfp) is pentafluorophenyl or perfluorophenyl.

Any metal or metalloid capable of forming a coordination complex which is resistant to degradation by water (or other Bronsted or Lewis Acids) may be used or contained in the noncoordinating anion. Suitable metals include, but are not limited to, aluminum, gold, platinum and the like. Suitable metalloids include, but are not limited to, boron, phosphorus, silicon and the like. The description of noncoordinating anions and precursors thereto of the documents of the foregoing paragraphs are incorporated by reference for purposes of U.S. patent practice.

An additional method of making the active polymerization catalysts of this invention uses ionizing anion precursors which are initially neutral Lewis acids but form a metal cationic complex and the noncoordinating anion upon ionizing reaction with the invention compounds, for example tris(pentafluorophenyl)boron acts to abstract a hydrocarbyl, hydride or silyl ligand to yield an invention metal cationic complex and stabilizing noncoordinating anion, see EP-A-0 427 697 and EP-A-0 520 732 for illustration utilizing analogous Group 4 metallocene compounds. See also the methods and compounds of EP-A-0 495 375. The description of noncoordinating anions and precursors thereto of these documents are similarly incorporated by reference for purposes of U.S. patent practice.

When the cation portion of an ionic noncoordinating anion precursor is a Bronsted acid such as protons or protonated Lewis bases (excluding water), or a reducible Lewis acid such as ferrocenium or silver cations, or alkaline metal or alkaline earth metal cations such as those of sodium, magnesium or lithium cations, the transition metal to activator molar ratio may be any ratio, but preferably from about 10:1 to 1:10, more preferably from about 5:1 to 1:5, even more preferably from about 2:1 to 1:2 and most preferably from about 1.2:1 to 1:1.2 with the ratio of about 1:1 being the most preferred.

The catalyst complexes of the invention are useful in polymerization of unsaturated monomers conventionally known to be polymerizable under coordination polymerization conditions using metallocenes. Such conditions are well known and include solution polymerization, slurry polymerization, gas-phase polymerization, and high pressure polymerization. The catalyst of the invention may be supported and as such will be particularly useful in the known operating modes employing fixed-bed, moving-bed, fluid-bed, slurry or solution processes conducted in single, series or parallel reactors.

When using the catalysts of the invention, particularly when immobilized on a support, the total catalyst system will generally additionally comprise one or more scavenging compounds. The term "scavenging compounds" as used in this application and its claims is meant to include those compounds effective for removing polar impurities from the reaction environment. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The polar impurities, or catalyst poisons include water, oxygen, metal impurities, etc. Preferably steps are taken before provision of such into the reaction vessel, for example by chemical treatment or careful separation techniques after or during the synthesis or preparation of the various components, but some minor amounts of scavenging compound will still normally be used in the polymerization process itself.

Typically the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triethyl borane, triisobutyl aluminum, methylalumoxane, isobutyl aluminumoxane, and n-octyl aluminum. Those scavenging compounds having bulky or $C_6$–$C_{20}$ linear hydrocarbyl substituents covalently bound to the metal or metalloid center being preferred to minimize adverse interaction with the active catalyst. Examples include triethylaluminum, but more preferably, bulky compounds such as triisobutylaluminum, triisoprenylaluminum, and long-chain linear alkyl-substituted aluminum compounds, such as tri-n-hexylaluminum, tri-n-octylaluminum, or tri-n-dodecylaluminum. When alumoxane is used as activator, any excess over the amount needed to activate the catalysts present will act as scavenger compounds and additional scavenging compounds may not be necessary. Alumoxanes also may be used in scavenging amounts with other means of activation, e.g., methylalumoxane and triisobutyl-aluminoxane. The amount of scavenging agent to be used with Group 4–6 catalyst compounds of the invention is minimized during polymerization reactions to that amount effective to enhance activity and avoided altogether if the feeds can be sufficiently free of adventitious impurities.

The catalyst according to the invention may be supported for use in gas phase, bulk, slurry polymerization processes, or otherwise as needed. Numerous methods of support are known in the art for copolymerization processes for olefins, particularly for catalysts activated by alumoxanes, any is suitable for the invention process in its broadest scope. See, for example, U.S. Pat. Nos. 5,057,475 and 5,227,440. An example of supported ionic catalysts appears in WO 94/03056. A particularly effective method is that described U.S. Pat. No. 5,643,847, and WO 96/04319. A bulk, or slurry, process utilizing supported, invention Group 4–6 metal compounds activated with alumoxane co-catalysts can be utilized as application. Both inorganic oxide and polymeric supports may be utilized in accordance with the knowledge in the field. See U.S. Pat. Nos. 5,422,325, 5,427,991, 5,498,582, 5,466,649, copending U.S. patent applications Ser. Nos. 08/265,532 and 08/265,533, both filed Jun. 24, 1995, and international publications WO 93/11172 and WO 94/07928. Each of the foregoing documents is incorporated by reference for purposes of U.S. patent practice.

In preferred embodiments of the process for this invention, the catalyst system is employed in liquid phase (solution, slurry, suspension, bulk phase or combinations thereof), in high pressure liquid or supercritical fluid phase, or in gas phase. Each of these processes may be employed in singular, parallel or series reactors. The liquid processes comprise contacting olefin monomers with the above described catalyst system in a suitable diluent or solvent and allowing said monomers to react for a sufficient time to produce the invention copolymers. Hydrocarbyl solvents are suitable, both aliphatic and aromatic, hexane and toluene are preferred. Halocarbon solvents, e.g., methylene chloride will additionally be suitable. Bulk and slurry processes are typically done by contacting the catalysts with a slurry of liquid monomer, the catalyst system being supported. Gas phase processes typically use a supported catalyst and are conducted in any manner known to be suitable for ethylene homopolymers or copolymers prepared by coordination polymerization. Illustrative examples may be found in U.S. Pat. Nos. 4,543,399, 4,588,790, 5,028,670, 5,382,638, 5352, 749, 5,436,304, 5,453,471, and 5,463,999, and WO 95/07942. Each is incorporated by reference for purposes of U.S. patent practice.

Generally speaking the polymerization reaction temperature can vary from about −50° C. to about 250° C. Preferably the reaction temperature conditions will be from −20° C. to 220°, more preferably below 200° C. The pressure can vary from about 1 mm Hg to 2500 bar, preferably from 0.1 bar to 1600 bar, most preferably from 1.0 to 500 bar. Where lower molecular weight copolymers, e.g., Mn<10,000, are sought it will be suitable to conduct the reaction processes at temperatures above about 0° C. and pressures under 500 bar. The multiboron activators of U.S. Pat. No. 5,278,119 can additionally be employed to facilitate the preparation of the low molecular weight copolymers of the invention.

Advantageously, the ligand behavior in the coordination environment around the metal center permits the ready preparation of mixed polymer blends with a single metal compound according to the invention in a single polymerization reactor. One method of tailoring the properties of a polymer resin is to blend a set of different polymers, each having a distinct combination of properties, into a homogeneous product with a new combination of properties distinguishable from those of the individual components. These products can be useful for applications such as film, bottle, and pipe resins in conjunction with blow molding processes. High $M_w$ components add strength to the blend while low $M_w$ components add processibility.

The ability to control the relative ratio of components in the blend would allow properties such as tear strength to be optimized. The formation of these blended polymers can be achieved ex situ through mechanical blending or in situ through the use of a mixed catalyst system. It is generally believed that in situ blending provides a more homogeneous product and allows the blend to be produced in one step. The use of mixed catalyst systems for in situ blending involves combining more than one catalyst in the same reactor to simultaneously produce multiple distinct polymer products. This method requires additional catalyst synthesis and the various catalyst components must be matched for their activities, the polymer products they generate at specific conditions, and their response to changes in polymerization conditions.

An alternative to using catalyst mixtures is to use a single catalyst precursor that can generate more than one active form in the reactor. This would allow the generation of in situ blends without requiring the synthesis of multiple catalysts. The catalysts of the invention contain components that can show lability. Variable temperature NMR studies can verify the lability of ligand components in metal complexes and neutral donor ligands, as exist in the catalysts of the invention, generally show the greatest degree of lability. In addition, compounds containing tris(pyrazolyl)borate ligands are known in which the ligand can adopt any of several coordination modes with bidentate and tridentate coordination being the most common. There is also evidence in Carrano, et. al. (Inorg. Chem., 1989, 28, 4392) that the ligand can be converted between different coordination modes on a single molecule. Therefore, it is possible for either a neutral donor ligand or a component of the multidentate ligand system of the catalysts of the invention to show lability under reaction conditions.

With this behavior, a typical catalyst precursor of the invention forms an active catalyst species incorporating the labile component which can dissociate or be abstracted during polymerization to form additional active catalyst species. The final polymer blend is then determined by the relative populations of the individual catalyst species in the reactor. The extent or rate of dissociation or abstraction of the labile components can be controlled through thermal, photochemical, or electrochemical methods or through the addition of additional external donor species having the same or different identity to the labile components or external acceptor species that can abstract the labile component from the metal center. Examples 9–11 below illustrate broad polydispersity polyethylene blends achieved with a single invention metal compound utilized at different temperatures of polymerization.

Linear polyethylene, including high and ultra-high molecular weight polyethylenes, including both homo- and copolymers with other alpha-olefin monomers, alpha-olefinic and/or non-conjugated diolefins, for example, $C_3$–$C_{20}$ olefins, diolefins or cyclic olefins, are produced by adding ethylene, and optionally one or more of the other monomers, to a reaction vessel under low pressure (typically<50 bar), at a typical temperature of 20–250° C. with the invention catalyst that has been slurried with a solvent, such as hexane or toluene. Heat of polymerization is typically removed by cooling. Gas phase polymerization can be conducted, for example, in a continuous fluid bed gas-phase reactor operated at 2000–3000 kPa and 60–160° C., using hydrogen as a reaction modifier (100–200 ppm), $C_4$–$C_8$ comonomer feedstream (0.5–1.2 mol %), and $C_2$ feedstream (25–35 mol %). See, U.S. Pat. Nos. 4,543,399, 4,588,790, 5,028,670 and 5,405,922 and 5,462,999, which are incorporated by reference for purposes of U.S. patent practice.

Ethylene-α-olefin (including ethylene-cyclic olefin and ethylene-α-olefin-diolefin) elastomers of high molecular weight and low crystallinity can be prepared utilizing the catalysts of the invention under traditional solution polymerization processes or by introducing ethylene gas into a slurry utilizing the α-olefin or cyclic olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between −10–160° C. The process can be carried out in a stirred tank reactor, or more than one operated in series or parallel. See the general disclosure of U.S. Pat. No. 5,001,205 for general process conditions. See also, co-pending U.S. patent applications Ser. Nos. 08/426,363, filed Apr. 21, 1995 and Ser. No. 08/545,973 filed Oct. 20, 1995. All documents are incorporated by reference for description of polymerization processes, ionic activators and useful scavenging compounds.

Pre-polymerization of the supported catalyst of the invention may also be used for further control of polymer particle morphology in typical slurry or gas phase reaction processes in accordance with conventional teachings. For example such can be accomplished by pre-polymerizing a $C_2$–$C_6$ alpha-olefin for a limited time, for example, ethylene is contacted with the supported catalyst at a temperature of −15 to 30° C. and ethylene pressure of up to about 250 psig (1724 kPa) for 75 min. to obtain a polymeric coating on the support of polyethylene of 30,000–150,000 molecular weight. The pre-polymerized catalyst is then available for use in the polymerization processes referred to above. The use of polymeric resins as a support coating may additionally be utilized, typically by suspending a solid support in dissolved resin of such material as polystyrene with subsequent separation and drying. All documents are incorporated by reference for description of metallocene compounds, ionic activators and useful scavenging compounds.

Other olefinically unsaturated monomers besides those specifically described above may be polymerized using the catalysts according to the invention, for example, styrene, alkyl-substituted styrene, ethylidene norbornene, norbornadiene, dicyclopentadiene, and other olefinically-unsaturated monomers, including other cyclic olefins, such as cyclopentene, norbornene, and alkyl-substituted norbornenes. Additionally, alpha-olefinic macromonomers of up to 100 mer units, or more, may also be incorporated by copolymerization.

The catalyst compositions of the invention can be used as described above individually for coordination polymerization or can be mixed to prepare polymer blends with other known olefin polymerization catalyst compounds. By selection of monomers, blends of coordination catalyst compounds, polymer blends can be prepared under polymerization conditions analogous to those using individual catalyst compositions. Polymers having increased MWD for improved processing and other traditional benefits available from polymers made with mixed catalyst systems can thus be achieved.

The following examples are presented to illustrate the foregoing discussion. All parts, proportions and percentages are by weight unless otherwise indicated. All examples were carried out in dry, oxygen-free environments and solvents. Although the examples may be directed to certain embodiments of the present invention, they are not to be viewed as limiting the invention in any specific respect. In these examples certain abbreviations are used to facilitate the description. These include standard chemical abbreviations for the elements and certain commonly accepted abbreviations, such as: Me=methyl, Pz=pyrazolyl, and THF, or thf,=tetrahydrofuran.

All molecular weights are weight average molecular weight unless otherwise noted. Molecular weights (weight average molecular weight ($M_w$) and number average molecular weight ($M_n$) were measured by Gel Permeation Chromatography, unless otherwise noted, using a Waters 150 Gel Permeation Chromatograph equipped with a differential refractive index detector and calibrated using polystyrene standards. Samples were run in either THF (45° C.) or in 1,2,4-trichlorobenzene (145° C.) depending upon the sample's solubility using three Shodex GPC AT-80 M/S columns in series. This general technique is discussed in "Liquid Chromatography of Polymers and Related Materials III" J. Cazes Ed., Marcel Decker, 1981, page 207, which is incorporated by reference for purposes of U.S. patent practice herein. No corrections for column spreading were employed; however, data on generally accepted standards, e.g. National Bureau of Standards Polyethylene 1475, demonstrated a precision with 0.1 units for $M_w/M_n$ which was calculated from elution times. The numerical analyses were performed using Expert Ease' software available from Waters Corporation.

EXAMPLES

Example 1

Synthesis of [HB(3,5-Me$_2$Pz)$_3$]TiCl$_2$(thf)

Solid K[HB(3,5-Me$_2$Pz)$_3$] (1.82 g, 5.41 mmol) was slowly added to a suspension of TiCl$_3$(thf)$_3$ (2.00 g, 5.40 mmol) in thf (30 mL). During addition, the color changed from light blue to deep green and then to blue-green. After stirring at room temperature for 3d, the volatiles were removed from the dark blue mixture. The solid residue was extracted with CH$_2$Cl$_2$ (30 mL) and filtered. The solution was concentrated to 5 mL and pentane (40 mL) was slowly added to precipitate the product. The solid was collected on a glass fit and washed with pentane (2×20 mL). Residual solvent was removed under reduced pressure leaving the product as a blue powder (2.15 g, 4.40 mmol, 82%). The elemental analysis, IR spectrum, and magnetic moment were consistent with the title compound.

Example 2

Synthesis of [HB(3,5-Me$_2$Pz)$_3$]VCl$_2$(thf)

The title compound was synthesized similarly to the Ti analogue from K[HB(3,5-Me$_2$Pz)$_3$] (1.80 g, 5.35 mmol) and VCl$_3$(thf)$_3$ (2.00 g, 5.35 mmol) except that the reaction mixture was stirred for 18 h. Workup gave the product as a yellow-green powder (1.22 g, 2.48 mmol, 46%). The elemental analysis, IR spectrum, and magnetic moment were consistent with the title compound.

Example 3

Synthesis of [HB(3,5-Me$_2$Pz)$_3$]CrCl$_2$(thf)

The title compound was synthesized similarly to the Ti analogue from K[HB(3,5-Me$_2$Pz)$_3$] (0.90 g, 2.7 mmol) and CrCl$_3$(thf)$_3$ (1.00 g, 2.67 mmol) except that the reaction mixture was stirred for 1 d. Workup gave the product as a light green powder (0.81 g, 1.6 mmol, 62%). The elemental analysis, IR spectrum, magnetic moment, and X-ray crystallographic data were consistent with the title compound.

General Polymerization Method (Examples 4–17)

Polymerizations were performed in a hot nitrogen purged 500 mL Zipperclave reactor (Autoclave Engineers) in dry hexane (250 mL) as the polymerization solvent/diluent. The cocatalyst used was methylalumoxane (MAO) in a 10 wt % toluene solution. Usually, 2.5 mL of the solution was diluted with fresh toluene prior to injection into the reactor. The hexane in the reactor was then saturated with ethylene at the designated pressure and temperature and comonomer, if any, was added. The catalyst solution was prepared in the drybox by mixing from 5 to 50 mg of catalyst precursor with toluene (50 mL). The catalyst precursor solution was pumped to the reactor, and combined with the previously added cocatalyst solution, until the ethylene make-up flow became constant during the polymerization. The reactor temperature was controlled by a steam/cooling water mixture flowing through the reactor jacket. The polymerizations were run for 30 min. At the end, the ethylene was vented and the reactor was cooled down. The reactor contents were poured into a 1 L beaker and treated with isopropyl alcohol or acetone. The polymer solvent mixture was blown down with nitrogen or filtered to recover the polymer. The final product was dried under vacuum at 60 to 90° C. for about 12 h. The samples were analyzed by GPC for molecular weight and polydispersity and by $^1$H NMR for branching in copolymerizations.

Example 4

Ethylene polymerization with [HB(3,5-Me$_2$Pz)$_3$] TiCl$_2$(thf) at 30° C.

A total of 13.0 mg of [HB(3,5-Me$_2$Pz)$_3$]TiCl$_2$(thf) in toluene solution was pumped into a 500 mL stainless steel reactor containing 250 mL hexane, 2.5 mL 10% MAO in toluene, and 76 psi ethylene. The polymerization was run for 30 min while the reactor was maintained at 30° C. and subsequent workup of the polymer product gave 0.9 g of polyethylene with $M_w$=6.99×10$^5$ and polydispersity of 4.1.

Example 5

Ethylene polymerization with [HB(3,5Me$_2$Pz)$_3$] TiCl$_2$(thf) at 60° C.

A total of 12.7 mg of [HB(3,5-Me$_2$Pz)$_3$]TiCl$_2$(thf) in toluene solution was pumped into a 500 mL stainless steel reactor containing 250 mL hexane, 2.5 mL 10% MAO in toluene, and 125 psi ethylene. The polymerization was run for 30 min while the reactor was maintained at 60° C. and subsequent workup of the polymer product gave 1.4 g of polyethylene with $M_w$=3.34×105 and polydispersity of 9.2.

Example 6

Ethylene polymerization with [HB(3,5-Me$_2$Pz)$_3$] TiCl$_2$(thf) at 115° C.

A total of 24.0 mg of [HB(3,5-Me$_2$Pz)$_3$]TiCl$_2$(thf) in toluene solution was pumped into a 500 mL stainless steel reactor containing 250 mL hexane, 2.5 mL 10% MAO in toluene, and 275 psi ethylene. The polymerization was run for 30 min while the reactor was maintained at 115° C. and subsequent workup of the polymer product gave 2.2 g of polyethylene with $M_w$=3.07×105 and polydispersity of 20.8.

Example 7

Ethylene polymerization with [HB(3,5-Me$_2$Pz)$_3$] TiCl$_2$(thf) at 140° C.

A total of 27.0 mg of [HB(3,5-Me$_2$Pz)$_3$]TiCl$_2$(thf) in toluene solution was pumped into a 500 mL stainless steel reactor containing 250 mL hexane, 2.5 mL 10% MAO in toluene, and 375 psi ethylene. The polymerization was run for 30 min while the reactor was maintained at 30° C. and subsequent workup of the polymer product gave 3.5 g of polyethylene with $M_w$=3.90×10$^5$ and polydispersity of 21.3.

Example 8

Ethylene/1-Hexene polymerization with [HB(3,5-Me$_2$Pz)$_3$]TiCl$_2$(thf) at 60° C.

A total of 30.0 mg of [HB(3,5-Me$_2$Pz)$_3$]TiCl$_2$(thf) in toluene solution was pumped into a 500 mL stainless steel reactor containing 250 mL hexane, 2.5 mL 10% MAO in toluene, 15 mL 1-hexene, and 61 psi ethylene. The polymerization was run for 30 min while the reactor was maintained at 60° C. and subsequent workup of the polymer product gave 0.6 g of ethylene/hexene copolymer with $M_w$=7.6×10$^4$, polydispersity of 7.6, and 8 branches/1000C.

Example 9

Ethylene polymerization with [HB(3,5-Me$_2$Pz)$_3$] VCl$_2$(thf) at 30° C.

A total of 11.3 mg of [HB(3,5-Me$_2$Pz)$_3$]VCl$_2$(thf) in toluene solution was pumped into a 500 mL stainless steel reactor containing 250 mL hexane, 2.5 mL 10% MAO in toluene, and 75 psi ethylene. The polymerization was run for 30 min while the reactor was maintained at 30° C. and subsequent workup of the polymer product gave 4.2 g of polyethylene with $M_w$=6.89×10$^5$ and polydispersity of 21.2.

Example 10

Ethylene polymerization with [HB(3,5-Me$_2$Pz)$_3$] VCl$_2$(thf) at 60° C.

A total of 8.2 mg of [HB(3,5-Me$_2$Pz)$_3$]VCl$_2$(thf) in toluene solution was pumped into a 500 mL stainless steel reactor containing 250 mL hexane, 2.5 mL 10% MAO in toluene, and 125 psi ethylene. The polymerization was run for 30 min while the reactor was maintained at 60° C. and subsequent workup of the polymer product gave 1.9 g of polyethylene with $M_w$=3.34×10$^5$ and polydispersity of 29.2.

Example 11

Ethylene polymerization with [HB(3,5-Me$_2$Pz)$_3$] VCl$_2$(thf) at 115° C.

A total of 21.8 mg of [HB(3,5-Me$_2$Pz)$_3$]VCl$_2$(thf) in toluene solution was pumped into a 500 mL stainless steel reactor containing 250 mL hexane, 2.5 mL 10% MAO in toluene, and 275 psi ethylene. The polymerization was run for 30 min while the reactor was maintained at 115° C. and subsequent workup of the polymer product gave 1.4 g of polyethylene with $M_w$=9.3×10$^4$ and polydispersity of 22.7.

Example 12

Ethylene polymerization with [HB(3,5-Me$_2$Pz)$_3$] VCl$_2$(thf) at 140° C.

A total of 8.8 mg of [HB(3,5-Me$_2$Pz)$_3$]VCl$_2$(thf) in toluene solution was pumped into a 500 mL stainless steel reactor containing 250 mL hexane, 2.5 mL 10% MAO in toluene, and 350 psi ethylene. The polymerization was run for 30 min while the reactor was maintained at 140° C. and subsequent workup of the polymer product gave 2.1 g of polyethylene with $M_w$=3.34×10$^5$ and polydispersity of 71.0.

Example 13

Ethylene/1-Hexene polymerization with [HB(3,5-Me$_2$Pz)$_3$]VCl$_2$(thf) at 60° C.

A total of 8.6 mg of [HB(3,5-Me$_2$Pz)$_3$]VCl$_2$(thf) in toluene solution was pumped into a 500 mL stainless steel reactor containing 250 mL hexane, 2.5 mL 10% MAO in toluene, 15 mL 1-hexene, and 60 psi ethylene. The polymerization was run for 30 min while the reactor was maintained at 60° C. and subsequent workup of the polymer product gave 1.2 g of ethylene/hexene copolymer with $M_w$=1.32×10$^5$, polydispersity of 15.2, and 6 branches/1000C.

Example 14

Ethylene polymerization with [HB(3,5-Me$_2$Pz)$_3$] CrCl$_2$(thf) at 30° C.

A total of 9.6 mg of [HB(3,5-Me$_2$Pz)3]CrCl$_2$(thf) in toluene solution was pumped into a 500 mL stainless steel reactor containing 250 mL hexane, 2.5 mL 10% MAO in toluene, and 75 psi ethylene. The polymerization was run for 30 min while the reactor was maintained at 30° C. and subsequent workup of the polymer product gave 0.4 g of polyethylene with $M_w$=3.68×10$^5$ and polydispersity of 60.8.

Example 15

Ethylene polymerization with [HB(3,5-Me$_2$Pz)$_3$] CrCl$_2$(thf) at 60° C.

A total of 12.8 mg of [HB(3,5-Me$_2$Pz)$_3$]CrCl$_2$(thf) in toluene solution was pumped into a 500 mL stainless steel reactor containing 250 mL hexane, 2.5 mL 10% MAO in toluene, and 125 psi ethylene. The polymerization was run for 30 min while the reactor was maintained at 60° C. and subsequent workup of the polymer product gave 1.0 g of polyethylene with $M_w$=2.78×10$^5$ and polydispersity of 34.6.

Example 16

Ethylene polymerization with [HB(3,5-Me$_2$Pz)$_3$]CrCl$_2$(thf) at 115° C.

A total of 28.2 mg of [HB(3,5-Me$_2$Pz)$_3$]CrCl$_2$(thf) in toluene solution was pumped into a 500 mL stainless steel reactor containing 250 mL hexane, 2.5 mL 10% MAO in toluene, and 274 psi ethylene. The polymerization was run for 30 min while the reactor was maintained at 115° C. and subsequent workup of the polymer product gave 1.1 g of polyethylene with $M_w$=2.4×10$^4$ and polydispersity of 14.1.

Example 17

Ethylene polymerization with [HB(3,5-Me$_2$Pz)$_3$]CrCl$_2$(thf) at 140° C.

A total of 29.7 mg of [HB(3,5-Me$_2$Pz)$_3$]CrCl$_2$(thf) in toluene solution was pumped into a 500 mL stainless steel reactor containing 250 mL hexane, 2.5 mL 10% MAO in toluene, and 350 psi ethylene. The polymerization was run for 30 min while the reactor was maintained at 140° C. and subsequent workup of the polymer product gave 1.6 g of polyethylene with $M_w$=2.0×10$^4$ and polydispersity of 10.1.

TABLE 1

Performance Comparison:

| Compound | Temp. (° C.)* | g PE/g Cat · h | g PE/ mmol Cat · h |
|---|---|---|---|
| Comparative Catalysts | — | — | — |
| A) [HBPz$_3$]CrCl$_2$(py) | 30 | 2.3 | 0.97 |
| B) [HBPz$_3$]CrCl$_2$(py) | 60 | 0.14 | 0.06 |
| C) [HB(5-Me-3-Ph-Pz)$_3$]CrCl$_2$ | 30 | 27.5 | 16.6 |
| D) [HB(5-Me-3-Ph-Pz)$_3$]CrCl$_2$ | 60 | 1.5 | 0.91 |
| Invention Catalysts | — | — | — |
| E) [HB(3,5-Me$_2$Pz)$_3$]TiCl$_2$(thf) | 30 | 140 | 68 |
| F) [HB(3,5-Me$_2$Pz)$_3$]TiCl$_2$(thf) | 60 | 227 | 111 |
| G) [HB(3,5-Me$_2$Pz)$_3$]VCl$_2$(thf) | 30 | 739 | 363 |
| H) [HB(3,5-Me$_2$Pz)$_3$]VCl$_2$(thf) | 60 | 464 | 228 |
| I) [HB(3,5-Me$_2$Pz)$_3$]CrCl$_2$(thf) | 30 | 79 | 39 |
| J) [HB(3,5-Me$_2$Pz)$_3$]CrCl$_2$(thf) | 60 | 148 | 73 |

*polymerization temperature, all examples run as illustrated in the foregoing examples The examples above illustrate significant improvement over the WO 97/17379 examples both with respect to catalyst productivities (A–D vs. I, J) and in certain examples the increasing activity at higher polymerization temperatures.

Figure 2:
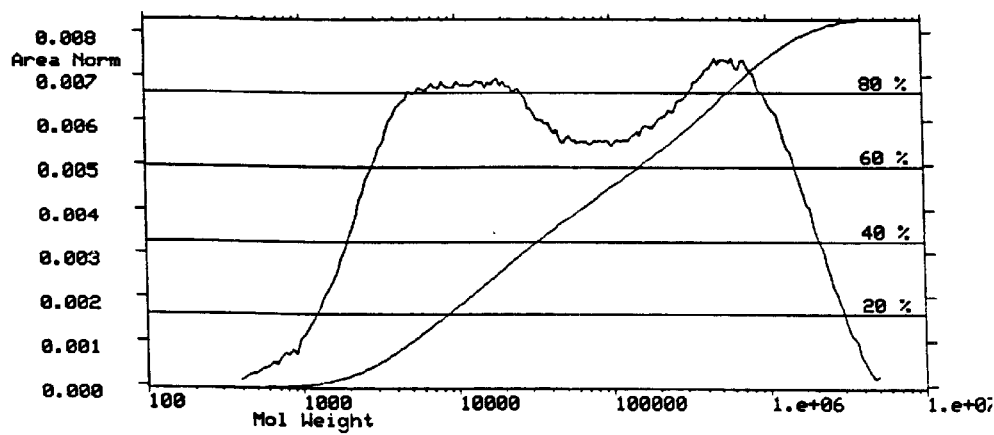
Figure 3:
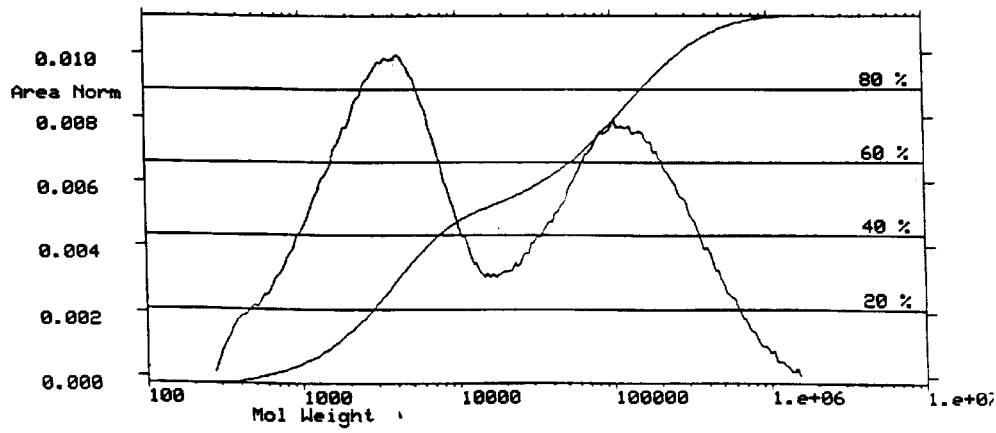

WO 97/17379 also illustrates that the catalyst can be used to control polymer MWD, especially for bimodal products, and GPC plots are provided for three examples. However, the MWD is controlled by changing the substitution pattern on the pyrazole rings. There is no explanation as to mechanism. The WO 97/17379 examples use three different structures run under the same polymerization conditions. The examples above use the same structure run under three different polymerization temperature conditions. Therefore, the WO 97/17379 phenomena are based on changes in the structure of the ancillary ligand set, whereas those of this invention are based on the lability of ligand components in response to changing reactor conditions. Furthermore, the catalysts of this invention do not specifically control polymer MWD, but instead control the relative amounts of polymer components in a blended product which inherently has a broad MWD, see FIGS. 1–3.

The use of reduced metal centers is significant for the present invention because the presence of additional electrons on the metal center, relative to do complexes, may increase the lability of donor groups in the coordination sphere. Also, since six-coordinate, pseudooctahedral geometries are very favorable for transition metals (especially electron deficient early transition metals) the majority of tris(pyrazolyl)borate complexes related to catalysis tend to have the form TpMX$_3$ where the X ligands may be the same or different anionic ligands. Since the Tp ligand generally occupies three coordination sites and the X ligands occupy the other three coordination sites, they form pseudooctahedral complexes without the presence of additional neutral donor ligands. However, for non-d$^0$ complexes in a +3 oxidation state, the charge on the metal can be balanced by one Tp ligand and 2 X ligands. This leaves one coordination site still available, and thus, allows the addition of the neutral donor ligand L. Therefore, by using non-d$^0$ metals, complexes can be isolated that possess excess, potentially labile, donor ligands that are not available in the d$^0$ analogues.

We claim:

1. An olefin polymerization catalyst composition comprising the reaction product of a cocatalyst and a catalyst precursor wherein the catalyst precursor comprises a reduced oxidation state Group 4–6 metal compound having a substituted tris(pyrazolyl)borate ligand and a plurality of single or multidentate uninegative ligands, excluding cyclopentadienyl ligands, and at least one neutral donor group.

2. The catalyst composition of claim 1 wherein the metal of said Group 4–6 metal compound is selected from the group consisting of Ti, V, and Cr.

3. The catalyst composition of claim 1 wherein the metal of said Group 4–6 metal compound is vanadium.

4. The catalyst composition of claim 1 wherein said Group 4–6 metal compound is represented by the formula:

$$TpMX_nL_p$$

where Tp is a substituted tris(pyrazolyl)borate ligand; M is a Group 4–6 transition metal; X is halogen, alkoxide, aryloxide, amide, phosphide, hydride, hydrocarbyl, substituted hydrocarbyl, halocarbyl, substituted halocarbyl; hydrocarbyl- or halocarbyl-substituted organometalloid, or two groups are joined and bound to the primary ligand or transition metal to form a ring structure, or one or more groups can contain a neutral donor group; L is a neutral donor group which stabilizes the complex; n is a number which is determined by counterbalancing the charge on the metal such that the metal remains in a reduced oxidation state and the overall charge on said metal compound is neutral; p is a number from 1–3, as necessary to stabilize the compound.

5. The catalyst composition of claim 4 wherein M is selected from the group consisting of Ti, V, and Cr.

6. The catalyst composition of claim 5 wherein M is vanadium.

7. The catalyst composition of claim 4 wherein said metal compound is reacted with an alkylalumoxane or an aluminum alkyl cocatalyst.

8. The catalyst composition of claim 7 wherein said alkylalumoxane is selected from the group consisting of methylalumoxane and modified methylalumoxanes.

9. The catalyst composition of claim 4 wherein said metal compound is reacted with an ionizing noncoordination anion cocatalyst.

10. A polymerization process comprising contacting one or more monomers polymerizable by at least one of coordination polymerization and insertion polymerization under suitable polymerization conditions with a catalyst comprising a reduced oxidation state Group 4–6 metal compound having a substituted tris(pyrazolyl)borate ancillary ligand and a plurality of single or multidentate uninegative ligands, excluding cyclopentadienyl ligands, and at least one neutral donor group.

11. The process of claim 10 wherein the metal of said Group 4–6 metal compound is selected from the group consisting of Ti, V, and Cr.

12. The process of claim 10 wherein the metal of said Group 4–6 metal compound is vanadium.

13. The process of claim 10 wherein said Group 4–6 metal compound is represented by the formula:

$$TpMX_nL_p$$

where Tp is a substituted tris(pyrazolyl)borate ligand; M is a Group 4–6 transition metal; X is halogen, alkoxide, aryloxide, amide, phosphide, hydride, hydrocarbyl, substituted hydrocarbyl, halocarbyl, substituted halocarbyl; hydrocarbyl- or halocarbyl-substituted organometalloid, or two groups are joined and bound to the primary ligand or transition metal to form a ring structure, or one or more groups can contain a neutral donor group; L is a neutral donor group which stabilizes the complex; n is a number which is determined by counterbalancing the charge on the metal such that the metal remains in a reduced oxidation state and the overall charge on said metal compound is neutral; p is a number from 1–3, as necessary to stabilize the compound.

14. The process of claim 13 wherein M is selected from the group consisting of Ti, V, and Cr.

15. The process of claim 14 wherein M is vanadium.

16. The process of claim 13 wherein Tp is of the formula:

$$HB(3,5-Me_2C_3N_2H)_3$$

wherein Me is methyl.

17. The process of claim 13 wherein L is tetrahydrofuran.

18. The process of claim 10 wherein said metal compound is reacted with an alkylalumoxane or an aluminum alkyl cocatalyst activator.

19. The process of claim 18 wherein said alkylalumoxane is selected from the group consisting of methylalumoxane and modified methylalumoxanes.

20. The process of claim 10 wherein said metal compound is reacted with an ionizing noncoordination anion cocatalyst.

21. The process of claim 10 wherein said monomers comprise at least one member of the group consisting of ethylene, alpha-olefins, cyclic olefins, non-conjugated diolefins, acetylenically unsaturated monomers, olefinically unsaturated aromatic monomers, and $C_{20}$–$C_{100}$ macromonomers.

22. The process of claim 21 wherein said monomers comprise at least one member of the group consisting of ethylene and $C_3$–$C_{20}$ alpha-olefins.

23. The process of claim 10 wherein said catalyst additionally comprises a solid porous support.

24. The process of claim 10 wherein the polymerization temperature ranges from about −50° C. to about 250° C.

25. The process of claim 10 wherein the pressure ranges from about 1 mm Hg to 2500 bar.

26. The process of claim 10 wherein the catalyst is employed in liquid phase, in high pressure liquid or supercritical fluid phase, or in gas phase.

27. The process of claim 10 wherein mixed polymer blends are prepared in situ in a single polymerization reactor with a single one of said reduced oxidation state Group 4–6 metal compounds.

28. The process of claim 10 wherein said catalyst is blended with at least one other olefin polymerization catalyst to prepare a polymer blend.

29. A polymerization process comprising:
1) contacting one or more monomers polymerizable by at least one of coordination polymerization and insertion polymerization under suitable polymerization conditions with an activated catalyst comprising a reduced oxidation state Group 4–6 metal compound having a substituted tris(pyrazolyl)borate ancillary ligand and a plurality of single or multidentate uninegative ligands, excluding cyclopentadienyl ligands, and at least one neutral donor group, and
2) recovering the polymer produced.

30. The process of claim 29 wherein said catalyst is activated by cocatalyst.

31. The process of claim 30 wherein the catalyst is activated by a Ziegler cocatalyst.

32. The process of claim 31 wherein said Ziegler cocatalyst is an organometallic compound of a metal of Groups 1, 2, 12, or 13 of the Periodic Table of Elements.

* * * * *